Figure 1:
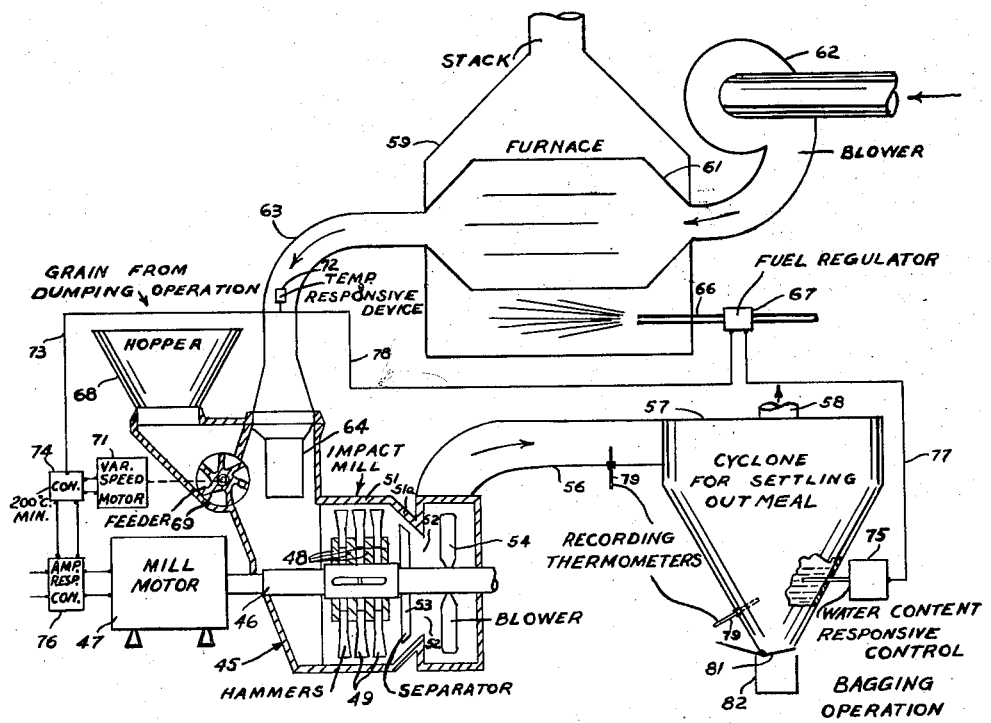

Sept. 30, 1958　　CARLOS S. FERNANDEZ DIEZ DE SOLLANO ET AL　　2,854,339

METHOD OF MAKING CORN MEAL

Filed Oct. 1, 1952

INVENTOR.
Carlos S. Fernandez Diez De Sollano
Jose Maria Berriozabal
BY
Harry W. Brelsford
ATTORNEY

United States Patent Office 2,854,339
Patented Sept. 30, 1958

2,854,339

METHOD OF MAKING CORN MEAL

Carlos S. Fernandez Diez de Sollano and José María Berriozabal, Mexico City, Mexico, assignors to Process Millers, Inc., Las Vegas, Nevada, a corporation of Nevada Application October 1, 1952, Serial No. 312,632

4 Claims. (Cl. 99—80)

This invention relates to the milling of whole corn grains and has particular reference to a process whereby a whole grain product, such as corn meal is obtained that will not turn rancid and will store perfectly over long periods of time.

This application is a continuation-in-part of our co-pending application Serial Number 172,274, filed July 6, 1950, and entitled Method of Milling Grain Kernels and Product.

The invention is based on the discovery of a novel method of milling whole corn grains wherein the natural enzymes of the grain that cause rancidity become deadened or destroyed, resulting in a dry, comminuted and sterile product that is nonrancidifying in character.

The word "enzymes" as used herein refers to the enzymes that cause rancidity including esterases such as lipase, lecithinase, etc.

The enzymes are the active agents causing rancidity and when these chemical substances are denatured or destroyed rancidity is avoided. While various treatments are known to destroy enzymes, the better known processes produce undesirable effects in the taste, nutrition and value of the product. This invention leaves no undesirable characteristics. The nutrition of the natural oils and fats is retained as well as the vitamin content. Protein is largely unaffected, and the digestible content is actually increased. The flavor of the corn meal is not only pleasing and highly acceptable but is an improvement over corn meal of any type heretofore available in commerce.

More particularly, the novel method of the invention comprises the steeping of the whole corn grains in water under controlled conditions of temperature and time of steeping, followed by the simultaneous comminution and dehydration of the steeped grains under controlled temperature conditions. The natural enzymes of the grains are debilitated in the steeping step of the method and are finally destroyed in the combined comminuting and dehydrating step while the comminuted resultant product is completely sterilized during the performance of the second step of the method. Simultaneous comminution and dehydration of the steeped whole grains may be effected by comminuting the steeped grains in a grinding mill, preferably of the hammer type, while simultaneously subjecting the steeped grains, as they are being comminuted, to the dehydrating action of heated gases. We have discovered that certain temperature conditions will effect sterilizing despite evaporative cooling effects. The two factors of enzyme control and sterilization coact with each other to produce whole corn meal possessing long shelf life. The invention prevents enzyme action by deadening and destroying the natural enzymes of the grain by a combination of thermal, chemical, and mechanical actions, and prevents creation of enzymes by bacteria and fungi by sterilizing the ground product.

The fact that bacteria and molds can cause formation of the different enzymes is well established. Thus, even complete deadening of the natural enzymes will not prevent rancidity if bacteria and fungi are allowed to react or multiply. The present invention kills these growths by sterilizing the grain without adversely affecting the resultant product.

As will appear more fully hereinafter, hot water is employed in the steeping step. While various types of mills may be used in our milling process, we prefer at present to use rotary impact mills. We have tested tooth mills and find that they perform a grinding operation but that it is difficult to obtain a dried product from them. Ball mills under suitable conditions and with modifications for passing air therethrough could be used. However, from a commercial standpoint we prefer to employ impact mills having a self-grading or self-separating action.

The final comminuted product of our process is a whole corn meal containing all of the ingredients of the original hydrolized whole grain kernel, including fats, oils, vitamins, protein and starch. Thus maximum nourishment from the grain is assured in our product. No rancidity develops in our meal, inasmuch as the enzymes which create rancidity are destroyed in the milling operation constituting the present invention. Also the meal is sterile; fungi and bacteria being killed during the milling operation. There is no possibility of the survival of insects or their eggs or larva during the milling operation. The meal has a good white color for corn grains that have a white core or body, such as white corn, but of course will be colored when made from corn grains which have a color throughout, such as yellow corn. The final product is very palatable and has good physical characteristics for meal from the particular type of corn grain used.

Whole kernel cereal grains heretofore have been disintegrated in mills of various types, including impact mills. The hulls of the grains are so tough, however, that the final product generally was not of suitable fineness, but instead a coarse product. We have discovered, however, that if the hulls are thoroughly softened and weakened, that they, as well as the body of the kernel, may be readily disintegrated. Grain thus softened, however, has a very high water content, which may be as great as 50%, and this gives rise to a severe problem in obtaining a dry meal. We have discovered also that this moisture may be removed by the simultaneous comminution and dehydration set forth above. An integral part of our invention therefore includes the use of a very strong and rapidly acting dehydrating agent, so that the grain will be dried as the comminuting progresses. In the preferred form of our invention we use a steady blast of extremely hot air to bring about this dehydrating action. Thus by the time the grain is ground to the desired degree of fineness, it is very dry, with a moisture content of about 8%.

The action of the process on the enzymes is the important action determining keeping qualities. The limits of various factors of the process are determined, however, by the effect of the process on the major components of grain, first, on the cellulose of the hulls, second, on starch content of the kernel, and third, on the protein of the kernel.

First, with regard to the action on the cellulose of the whole corn grains, the hot water steeping serves to weaken the binding material between the cellulose fibers and thus weaken the bran or hull. The steeped whole corn is thus more readily converted to meal in the subsequent step of dehydrating and comminution.

Second, with regard to the action on the starch content, gelatinization is the most important effect to be considered. The type of gelatinization referred to is the forming of a colloidal suspension or gel due to hydrolysis of starch. If the starch of the product is gelatinized, the dough obtained therefrom may have normal elasticity and plasticity, but is too sticky and glue-like for commercial operations and is unsuited for certain bakery products.

The steeping action gives, of course, a high water content to the grain, and after penetrating the hull the water begins penetration of the starch. The combination of moisture and temperature causes gelatinization and once the reversible phase is passed the product will be permanently gelatinized despite subsequent drying. The higher the temperature, the greater the gelatinization and whole corn grains are partially gelatinized by steeping in an aqueous bath of 82° C. if the steeping time is in excess of a half hour. Therefore, while high moisture and high temperatures increase the debilitating action on the enzymes, these factors are adverse to a satisfactory product because of gelatinization.

The drying action, which employs very high temperatures does not cause gelatinization because of the effects of evaporative cooling. The higher the water content, the greater is the cooling action. The quantity of hot air and quantity of steeped grain should be carefully regulated so that the final temperature of the dry meal will not exceed 73° C., such being below gelatinization because of the low water content of the finished product. If too much air is used or if the air is too hot, the meal has a higher temperature, and at extreme temperatures caramelization and toasting takes place which is deleterious for baking purposes.

Third, regarding the proteins, the effect of steeping temperature is not important on the proteins, and maximum steeping temperatures are determined by starch reactions. Conversely, maximum product temperatures in the drying are determined by the protein and have little effect on the starch. If the final product temperature is too high, certain of the protein materials such as the amino acid compounds and the glutamic acid compounds are subjected to a denaturing. Low water content in the meal accompanied by overheating causes in the resulting dough a coagulation and practically a polymerization of the amino compounds. There results poor elasticity and plasticity in the dough. The combination of temperature and moisture in the final meal is important. Therefore, while enzyme control favors high meal temperatures, the denaturing action on the protein and the protein compounds limits the final meal temperature.

It is a general object of the invention to produce whole corn meal products that keep for long periods of time and that are non-rancidifying.

It is another object of our invention to provide an improved process for making whole corn meal directly from the grain.

Another object is to provide a milling process that destroys or deadens enzymes and thus prevents the meal from becoming rancid.

Still another object is to provide a milling process for whole corn meal wherein the natural enzymes are deadened and in addition bacteria and fungi are destroyed to form a sterile product.

Another object is to provide a sterile meal from whole corn grain which will not become rancid and will have good keeping qualities.

Figure 2:
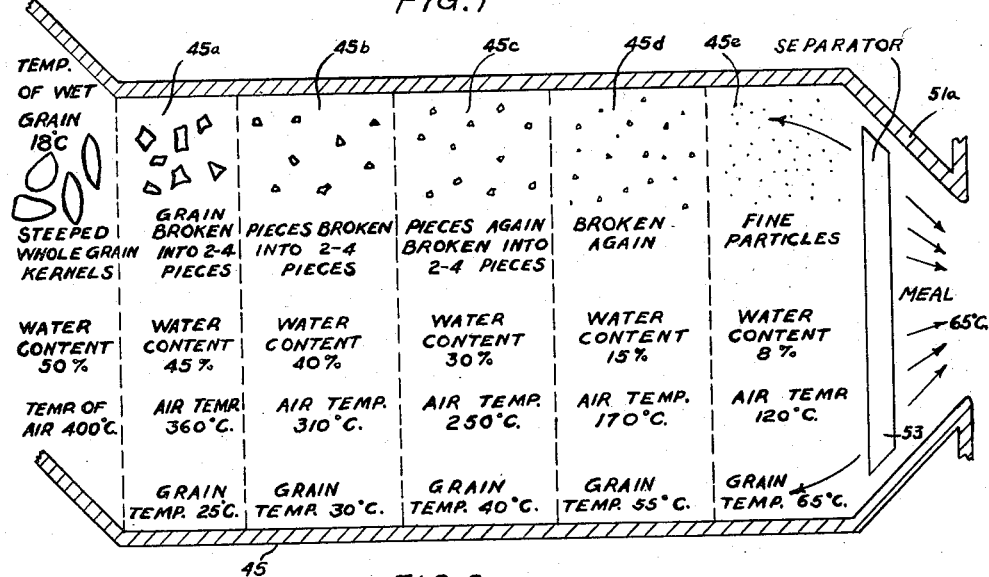

Other objects and advantages of our invention will be apparent in the following description and claims considered together with the accompanying drawings, in which Fig. 1 is a schematic view of the comminuting and dehydrating apparatus which may be employed with our invention and which receives the steeped whole corn, and Fig. 2 is a diagram with a description of the processes of comminution and dehydration that take place within the impact mill of Fig. 1.

Steeping step

Any suitable apparatus may be employed in carrying out the steeping step of the present invention. For example, the whole corn grains may be introduced into a rotatable drum provided with perforations which admit liquid but are small enough to prevent egress of the grain. The drum may then be rotated in a tank, containing the heated steeping water. The temperature of the steeping water and the time of steeping will be referred to more particularly hereinafter.

Properly steeped corn has a water content which varies according to the thickness of the corn. For thin or dent corn the water content may be as high as 50% with 45% and 46% being most common. For the larger thicker types of corn kernels the water content may be 40% or less. These percentages are proportions of total weight. These high water contents therefore give rise to the problem of dry milling of the steeped grain. Proper steeping will not affect the fats and oils and the associated vitamins.

As heretofore pointed out the enzymes are debilitated or weakened during the steeping step of the invention and the destruction thereof is completed during the second step of simultaneous comminution and dehydration of the steeped grain.

Comminuting, dehydrating step

Illustrated in Fig. 1 is a schematic diagram of the comminuting and dehydrating apparatus which we presently prefer in practicing our invention. While various types of mills can be used we have found that an impact mill is eminently satisfactory for effecting a progressive comminution of the steeped grain kernels. These impact mills are old and well known in the art and are available in various types, sizes and constructions. We prefer, however, at present to employ impact mills having an integral separator therein to classify the outlet materials according to mass. These impact mills generally have a series of plates mounted on a rotatable shaft and hammers are pivoted thereto near the periphery of the plates. These hammers revolve within the mill chamber but are spaced from the walls thereof by a distance of an inch to about ¼ of an inch depending upon the size of the mill. These impact mills effect comminution by striking the particles as they are borne on the turbulent air inside of the mill, breaking them by the blow, dashing them against the cylindrical mill chamber which results in further breaking, and the mill chamber in turn causes them to bounce back into the path of additional hammers.

In the drawing the impact mill may be referred to generally by the numeral 45 and may include a shaft 46 rotated by a mill motor 47 which may be of any type but is preferably an electric motor of constant speed. Mounted on the shaft may be a series of spaced plates 48 having hammers 49 pivoted near their peripheries. These hammers may be of a general elongated construction but will generally assume radial positions during rotation of the shaft 46. The mill may have a cylindrical body member 51 which is tapered as at 51a to form an outlet 52. Mounted on the shaft 46 opposite the tapered portion 51a, may be a series of radial blades 53 which act as centrifugal separators. Heavy or dense material is centrifugally thrown outwardly to the tapered portions of the housing where it is directed into the region of the hammers 49 for further pulverization. A blower 54 may be mounted on the shaft 46 to direct the output of the mill through a conduit 56 to a cyclone 57 wherein the product may be separated or settled out from the air, the clear air exiting through a stack or pipe 58.

As mentioned previously hot air is fed into the impact mill 45 and this hot air may be obtained from a suitable furnace 59 having a closed heater conduit 61 therein for the reception of atmospheric air forced into the conduit by a constant speed blower 62. Directly heated gases may also be used, such as the products of combustion of gaseous or vaporous fuels. After heating in the furnace 59 the air is passed through a conduit 63 to a nozzle 64 disposed in the upper end of the housing of the impact mill. There may be used in the furnace any suitable fuel which is subject to regulation, such as gaseous, liquid or powdered fuel and this may be introduced through a conduit 66 with the flow therein governed by a fuel regulator 67.

The wet steeped whole corn may be delivered from the steeping drum to a hopper 68 and the grain from the hopper may be fed at a metered, regulated rate to the impact mill by means of a rotary feeder 69. This feeder may be driven by a variable speed motor 71 that is preferably electric. A belt feed may be substituted for the rotary feeder 69.

It will be apparent that if corn is fed to the impact mill without the hot air being blasted therethrough, that the grain will be comminuted while in a mushy state and will be deposited over the interior of the mill, clogging the mill and stopping the motor. Accordingly a temperature responsive device 72 is provided in the conduit 63 from the furnace. This is connected by means of a conductor 73 to a control switch mechanism 74 for the variable speed motor 71 for the feeder. This mechanism 74 is so constructed that it will not energize the motor 71 until the air in the conduit 63 attains a temperature of about 200° C. This accordingly prevents the feeder 69 from supplying steeped grain to the mill until an adequate temperature is attained in the air being blasted through the impact mill.

Furthermore, we desire to regulate the speed of the feeder 69 as a function of output of the mill motor 47 so that the maximum output of the mill will be obtained. The maximum mill output can only be obtained when the mill motor is generating maximum power and this in turn may be reflected by the amperage of the electric current consumed by the mill motor. For this reason we provide an amperage responsive control device 76 through which the current for the mill motor passes. This device reflects the amperage of the mill motor to the control 74 so that the variable speed feeder motor will be increased in speed at all times when the mill motor is not operating at maximum power output. In this way the mill is operated at maximum capacity automatically in response to the current consumption of the mill motor, assuming that at all times the furnace is delivering hot air having a temperature of at least about 200° C.

Inasmuch as the quality of the product is the major objective in the entire milling process, the primary and overriding control is based upon the quality of the meal produced. This quality may be measured in terms of percentage of water content of the finished meal inasmuch as we have discovered that the keeping quality of corn meal is almost directly related to the water content, other factors remaining constant. If the air is not hot enough while passing through the impact mill, the water content of the meal will be excessive. If the air is too hot there will be too little water content. Accordingly we provide a control device 75 that is responsive directly to the water content of the finished meal. For this reason the device is placed toward the bottom of the cyclone 57 so that it may immediately sample the meal as it is delivered fresh from the impact mill. The control device 75 is connected directly by a conductor 77 to the fuel regulator 67 and reduces fuel when the water content is low and increases the fuel when the content is high. Therefore the water content of the meal directly controls the heat of the furnace and overrides any impulse or signal that may be delivered from the feeder control apparatus.

To complete the description of the automatic grain feed and fuel control it should be noted that a conductor 78 leads from the temperature responsive device 72 in the furnace outlet to the fuel regulator 67, completing a path from the motor control 74 to the fuel control 67. The feed control device 74 which governs the variable speed motor 71 also generates an electrical impulse to open or close the fuel regulator 67 in accordance with an increased or decreased grain demand signal from the amperage control 76. In actual practice the entire mill of Fig. 1 reaches a steady state condition in approximately half an hour after it is started. Recording thermometers 79 may be provided in the outlet conduit 58 and the cyclone 57 to indicate the temperatures of the outlet air and the meal respectively.

The automatically controlled system described also automatically compensates for changes in humidity of the atmospheric air being heated and it compensates for changes in the water content of the corn being received by the impact mill. This is because both of these factors affect the water content of the finished product and hence this is immediately reflected to the fuel regulator 67. The control from the amperage responsive device 72 and the water content device 75 are independent, but work together.

While various types of controls for the volume of the air could be devised, we prefer at present to maintain the volume of drying air constant, and obtain drying regulation by varying the temperature, as previously described. Accordingly the independent blower 62 and the mill blower 54 are selected to have the desired capacity, and they preferably deliver the same output. The blower 62 insures that the air in the furnace will be under a positive pressure. The upper limit of the flow of air through the mill will be determined primarily by the capacity of the separator and the mill, and the lower limit will be that necessary to prevent clogging of the mill, assuming, of course, that the air is heated in both instances. The specifications of the manufacturer of the mill will often be of assistance as a general guide on air flow or volume in employing the mill in our process.

In our process we employ air blasts of extremely high temperature but because of the cooling effect of rapid evaporation, the temperature of the product is relatively low. A final temperature of 73° C. should not be exceeded, for best results and quality of product. We do not have to regulate the air temperature with respect to the temperature of the meal inasmuch as we find that regulation with respect to the water content of the meal sufficiently regulates its temperature also. For example, when the water content control 75 is set for water contents of 10% to 5%, the corn meal temperatures are never excessive and generally remain about 65° C.

The finished meal may be packaged directly from the cyclone 57 as we have found that cooling the meal to room temperatures causes deterioration in the quality of the meal if humid or contaminated air is used. This bagging operation is illustrated diagrammatically in Fig. 1 wherein a damper type of shutoff mechanism 81 controls the flow of flour to a receptacle 82. While cloth or paper bags can be used for bagging or packaging our product, we prefer at present to employ a bag of waterproof plastic material inasmuch as this preserves the meal in extreme humidities encountered in tropical lowlands.

Illustrated in Fig. 2 is a diagrammatic representation of our simultaneous comminuting and dehydrating step which occurs within the confines of the impact mill 45 of Fig. 1. For purposes of illustration, the representative mill casing is divided into vertical sections with appropriate descriptive matter applicable to the sections. We have illustrated an air temperature of 400° C. which is a very satisfactory temperature in actual operation. There is no theoretical upper limit to the temperature of the air that we have discovered but from the commercial standpoint of heating the air, we have found that 900° to 1200°

C. is a commercial upper limit of temperature for heating apparatus commercially available. Temperatures in excess of 300° C. and up to 900° C. permit milling of grain at the maximum rated output of an impact mill, the temperature depending upon the amount of water present in the grain. The lower limit of temperature is fixed by the air temperature necessary for sterilization of the grain during the milling operation and this we have found to be approximately 180° C. However, it is difficult to operate a mill at near capacity with air of this temperature.

The water content of the grain kernels is illustrated as 50% water content which is a high water content compared to some types of corn. Dent corn may have a water content of 45% to 50% and the common larger variety of corn may have water contents of about 40% or less. This water content must be reduced to 10% or less to obtain meal with good keeping qualities. The temperature of the grain from the steeping operation is shown as 18° C. which may occur in the event of cold washing and during the milling operation the grain may be gradually heated to 65° C.

Shown in the first division 45a within the mill body 45 of Fig. 2, is the breaking of the grain kernels into large fragments. It is during this initial part of the comminuting operation that sterilization takes place inasmuch as the air is hottest at this region. While the body or interior of the various fragments or pieces is very slightly heated by the hot air, the outermost layer of each particle is heated to a very high temperature as soon as the surface moisture is evaporated. If this temperature is in excess of 180° C. all the fungi and bacteria will be killed instantly and the enzymes are apparently destroyed or at least neutralized. If the bacteria or fungi are present in cracks within the grain, the grain will invariably break along these cracks, exposing these surfaces to the full temperature of the hot air blast. This surface heating during this initial stage 45a is only on the very extreme surface and probably does not penetrate more than one thousandth of an inch.

While all details are not known, this sterilizing action is apparently aided by a natural glazing effect wherein the heat forms a glaze or crust on the exterior of the grain. This glaze seals the interior moisture of the grain so that it is not effective for evaporative cooling. This permits the exterior of the grain to be heated to very high temperatures and the sterilizing action seems to be substantially independent of the water content.

The exposure of the very wet and soaked kernels to the hot blast immediately dries the surface of the particles preventing any sticking or gumming of these particles regardless of the amount of water immediately below the surface. Therefore in spite of the relatively high water content in the first stage which may be as great as 45% or 50%, the particles react to the impact mill in much the same fashion as dry materials being broken in an impact mill. No collections of wet materials are possible which is important inasmuch as a small amount of accumulation of soggy or wet material would not only reduce the efficiency of the mill but could slow it down and stop the motor entirely.

The grain kernels are broken into particles by the rapidly whirling hammers of the impact mill and the hot air blasted through the mill immediately dries any fresh surfaces formed by the progressive comminution. The hammers also beat to pieces the germ of the kernel, spewing its fats and oils on nearby particles, dispersing this oil over particles from all parts of the kernel. The oil is thus subjected to the heat at its maximum effectiveness since the outermost film of a particle is least affected by evaporative cooling. While enzymes withstand high temperatures in a body of oil, they are rendered inactive at lower temperatures when present only in a film of oil. The effect of the mechanical smashing of the germs and dispersion of fats and oils together with the heat of drying is to render the enzymes still more inactive, and apparently deadening or destroying them.

The enzymes of the steeped grain delivered to the mill are weakened or debilitated due to the conditioning of the steeping. This preparatory weakening makes possible the positive deadening of the anzymes in the simultaneous comminuting and dehydrating step.

We have further discovered that the enzymes that cause rancidity may be kept in their deadened or immobilized condition, or the destroyed enzymes may be prevented from reactivating, by placing the meal in a dehydrated condition. The dehydrating action accompanying the comminution should be so regulated that the final comminuted product has a water content not greater than about 10% and preferably between 5 and 8%. If a water content of 14 or 15% is used the lipase enzymes can reform or regroup within a few months, whereas products of 5% water content can store for long periods without turning rancid.

The progress of the comminution is clearly illustrated in Fig. 2 wherein the particles become progressively smaller as they pass through sections 45b, 45c, 45d, and 45e. The water is evaporated off of the surface of the particles and the smaller the particles become the greater is the total exposed surface. Therefore the evaporation of the water is greatest in sections 45c and 45d and the drop in air temperature is greatest here also because of this absorption of water by the air. As the grain particles become smaller they are heated up faster and accordingly the greatest increase in temperature of the grain particles occurs in these sections also. While the turbulence of the air within the mill is very great, there is a general flow from inlet to outlet that carries the materials along so that comminution from one size takes place in different regions of the mill.

In the last section 45e the particles must pass through the centrifugal separator 53. If any of these are of large size or high mass they will be thrown outwardly where they will strike the inclined surface 51a to be returned to the region of the hammers for further comminution, as illustrated by the arrows leading toward the left. The fine material having the proper size will be carried through the centrifugal separator by the blast of air passing through the mill and will be carried through the blower 54 (Fig. 1) to the cyclone for settling.

The size of the impact mill employed is not critical and we have found that the peripheral velocity of the hammers may be used as the governing factor in the mill operation or selection. We find that the most satisfactory peripheral speed for corn is between 3500 and 5,000 meters per minute which of course is the product of the circumference of the rotative parts of the mill and the revolutions per minute.

The temperatures given in connection with Fig. 2 are typical corn milling temperatures. Thus the inlet air may be 400° C. or 450° C. and the outlet air from the mill may be about 120° C. and about 80° C. from the cyclone. The inlet temperature range may be from about 200° C. to 450° C. for commercial results. The quantity of the air per minute may remain constant as described previously.

The temperature of the corn meal is preferably in the range of 65° C. and 73° C. and should not exceed these values. If corn meal is heated much above these values, the action of gluten is impaired.

*Example*

The following is an example of the treatment of whole corn cereal grain in accordance with the present invention which was performed in Mexico City, Mexico, the elevation being approximately 7,500 feet above sea level.

Corn steeped in hot water only will make a satisfactory corn meal or corn grits. Water steeping will not produce a fine flour, however, because the hull has not been chemically attacked and the cellulose is so strong that fine comminution of the whole grain is not possible. Corn at room temperature may be placed in a tank of water at 92° C. whereupon the temperature drops to 82° C. and is held for one hour during which the temperature may drop to 72° C. This decreasing temperature for an hour sufficiently conditions the enzymes and can be used where there is not enough heat to maintain the temperature constant. The steeped grain may next be comminuted in a hammer mill through which air is blown having a temperature of 650° C. to 900° C. The final product may have a 10% water content, should not be over 75° C. in temperature and will store satisfactorily for at least 6 months. This 75° C. temperature is an apparent temperature only due to the outside of the corn fragments being hotter than the interior and upon holding for 5 to 10 minutes the temperature equalizes for the entire mass at not greater than the upper limit of about 73° C.

*Variables and limits*

The lowest practicable steeping temperature for effecting the enzyme debilitation of this invention is 68° C., but it is preferable to exceed this temperature. For whole corn meal which is not gelatinized the highest practicable temperature appears to be 82° C. For products where some degree of gelatinization is desired, 82° C. may be exceeded. The enzyme debilitation takes place in about two hours at 68° C. and with the steeping solution at 82° C. and above, the enzyme debilitation takes place in about half an hour. At 72° C. the steeping time is about one and two-thirds hours and at 78° C. the steeping time is about one hour. Steeping from 68° to 82° C. for two hours to one-half hour respectively does not ordinarily result in gelatinization for the whole corn grains when the bran coats are intact. Times in excess of these will generally result in gelatinization.

The enzymes delibitated, as mentioned previously, are the enzymes that cause rancidity such as the lipases and and the lecithinases. Other enzymes present in the grain are responsive to different temperatures, but the rancidifying enzymes become substantially weakened or debilitated in the presence of moisture at 68° C. or higher for the times specified.

Intermittent mechanical agitation simultaneously with circulation of the steeping bath is preferred in practice for commercially uniform results.

The simultaneous comminution and dehydration with gases initially not less than the critical minimum temperature of about 180° C. results in sterilization of the product. It is preferable that the dehydrating gases and the steeped grain be fed to the mill in the same conduit so that the whole kernels will receive at least momentary exposure to the hot gases to achieve the sterilizing temperature. There seems to be no upper limit of gas temperature within the practical range of heating, and temperatures for heated air of 900° C. have been satisfactorily employed. Undobtedly gas at 1200° C. would be satisfactory. Evaporative cooling prevents heating of the grain particles above the critical product temperature, provided the grain feed is adjusted to the air temperature and volume and vice versa. The grain is preferably comminuted while still hot from the steeping to maintain temperatures that are adverse to the enzymes.

The upper limit of grain product temperature during dehydration is 73° C. because of the denaturing of the amino acids by the combination of dehydration and temperature. Air saturation, together with the final desired water content, as a practical matter, limits the lower limit of product temperature of about 65° C., although lower product temperatures may be satisfactory. The higher product temperatures are more conducive to continued enzyme control. Product temperatures about 68° C. result in the highest quality for baking and other use and best storage occurs with product temperatures of 73° C.

The water content of the final product is also important in determining the keeping qualities. The practical upper limit of moisture content in the finished product is about 10%. The lower practical limit is not known but final products of water content of 5% have very satisfactory handling and baking properties. Generally, the lower the water content, the greater the keeping time, and whole ground meal of about 10% water content dehydrated with gases about 300° C. will keep for at least a year. If the water content is 5% or thereabouts, the meal will keep for longer periods.

While we have described our invention with reference to a specific process, we do not limit ourselves to this specific description nor otherwise, but we include all variations and modifications thereof as fall within the true spirit and scope of our invention.

We claim:

1. The method of producing a whole grain corn meal that keeps for long periods comprising: steeping whole corn kernels in non-alkaline water having a temperature of about 78° C. for about an hour; and then simultaneously comminuting the steeped corn to meal and dehydrating the steeped corn by hot gases not less than about 180° C. until the water content of the meal is not in excess of about 10%, the drying taking place such that the meal temperature is not above about 73° C. and the initial exposure of the whole corn kernels to the hot gases destroying bacteria and fungi and the process inactivating the enzymes that cause rancidity.

2. The method of producing a whole grain corn meal having a long shelf life comprising: steeping whole corn in water of generally neutral pH in the temperature range of 68° C. to 82° C. for two hours to one-half hour respectively; and then comminuting the steeped corn to a meal and simultaneously with the comminuting also dehydrating the steeped corn with hot gas not less than about 180° C. until the water content is not in excess of about 10%, the initial exposure of the hot gas to the steeped corn destroying bacteria and fungi and the process destroying the enzymes that cause rancidity.

3. The method of producing a whole grain corn meal comprising: steeping whole corn in hot water of neutral pH in the temperature range of 68° C. to 82° C. for about two hours to one-half hour respectively; then comminuting the steeped corn to the desired coarseness and simultaneously with comminuting also dehydrating the steeped corn by a hot gas of at least about 180° C. until the water content is about 10% maximum, the drying taking place such that the corn is never heated above an apparent temperature of 75° C., the initial exposure of the steeped corn kernels to the hot gases destroying bacteria and fungi, and the process destroying the enzymes that produce rancidity.

4. The method of preparing whole corn meal from whole corn grains which comprises: steeping whole corn grains in generally chemically neutral water, the steeping being carried out at a temperature in the range of about 68° C. to 82° C. and for a time period of about two hours to one-half hour respectively; and then subjecting the steeped whole corn grains to the direct action of a continuously flowing stream of drying gas heated to an initial temperature of not less than 180° C. to dry the grains while simultaneously comminuting the whole corn grains to a ground meal, the drying being continued for a time period sufficient to reduce the moisture content of the meal to not more than 10% by weight and taking place such that the final temperature of the meal does not exceed about 73° C., the exposure of the whole corn to the stream of drying gas during comminuting, destroying bacteria and fungi.

References Cited in the file of this patent
UNITED STATES PATENTS 826,983    Phippen  ------------  July 11, 1906

(Other references on following page)

UNITED STATES PATENTS

| | | |
|---|---|---|
| 987,560 | Erosa | Mar. 21, 1911 |
| 1,061,933 | Willford | May 13, 1913 |
| 1,268,960 | Lopez | June 11, 1918 |
| 1,334,366 | Garza | Mar. 23, 1920 |
| 1,423,830 | Christensen | July 25, 1922 |
| 1,662,401 | Sasseen | Mar. 13, 1928 |
| 2,152,367 | Smith | Mar. 28, 1939 |
| 2,509,418 | Brown | May 30, 1950 |
| 2,535,570 | Gordon | Dec. 26, 1950 |
| 2,584,893 | Lloyd | Feb. 5, 1952 |
| 2,585,978 | Van Atta | Feb. 19, 1952 |
| 2,704,257 | De Sollano et al. | Mar. 15, 1955 |